(12) United States Patent
Singh et al.

(10) Patent No.: US 7,096,388 B2
(45) Date of Patent: Aug. 22, 2006

(54) FAULT TOLERANCE SOFTWARE SYSTEM WITH PERIODIC EXTERNAL SELF-TEST FAILURE DETECTION

(75) Inventors: Navjot Singh, Denville, NJ (US); Timothy Tsai, Bridgewater, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 743 days.

(21) Appl. No.: 09/924,983

(22) Filed: Aug. 8, 2001

(65) Prior Publication Data

US 2003/0037289 A1    Feb. 20, 2003

(51) Int. Cl.
*G06F 11/00* (2006.01)

(52) U.S. Cl. ......................................................... 714/38

(58) Field of Classification Search .................. 714/38, 714/35; 717/124
See application file for complete search history.

(56) References Cited

U.S. PATENT DOCUMENTS

| | | | | |
|---|---|---|---|---|
| 5,778,230 | A * | 7/1998 | Wimble et al. | 717/131 |
| 5,901,315 | A * | 5/1999 | Edwards et al. | 717/124 |
| 6,058,393 | A * | 5/2000 | Meier et al. | 707/10 |
| 6,161,193 | A | 12/2000 | Garg et al. | |
| 6,161,196 | A * | 12/2000 | Tsai | 714/10 |
| 6,167,535 | A * | 12/2000 | Foote et al. | 714/38 |
| 6,360,332 | B1 * | 3/2002 | Weinberg et al. | 714/4 |
| 6,434,714 | B1 * | 8/2002 | Lewis et al. | 714/38 |
| 2002/0188890 | A1 * | 12/2002 | Shupps et al. | 714/38 |

OTHER PUBLICATIONS

Legato Automated Availability Manager, Legato Systems Inc., http://www.legato.com/products/availability/manager/, pp. 1-2, 2001.
SwiFt: Achieving High Availability through Software-Implemented Fault Tolerance, Avaya Labs Research, http://www.research.avayalabs.com/project/swift, pp. 1-4, Jul. 2001.
T. Tsai et al., "Reliability Testing of Applications on Windows NT," 30th Symposium on Fault-Tolerant Computing, 10 pages, 2000.
T. Tsai et al., "How Reliable are your NT Applications?" Windows 2000 Magazine, web exclusive, http://www.win2000mag.com/Articles/Content/7708_01.html, pp. 1-5, Feb. 2000.

* cited by examiner

*Primary Examiner*—Bryce P. Bonzo
(74) *Attorney, Agent, or Firm*—Ryan, Mason & Lewis, LLP

(57) ABSTRACT

Fault tolerance is improved in a computing system which includes one or more computing machines by (i) executing a control thread or other control program in conjunction with a fault tolerance software system running on at least one of the machines, and (ii) initiating via the control program a test script program which sends one or more requests to a monitored program. The test script program also processes corresponding responses to the one or more requests, and generates a return value utilizable by the control program to indicate a failure condition in the monitored program. The computing system may be configured in accordance with a client-server architecture, with the fault tolerance software system and the monitored program both running on a server of the system. The test script program is preferably implemented in an object-oriented programming language such as Java, such that one or more components of the test script program comprise a base class from which one or more other components of the test script program are generatable for use with the monitored program.

18 Claims, 7 Drawing Sheets

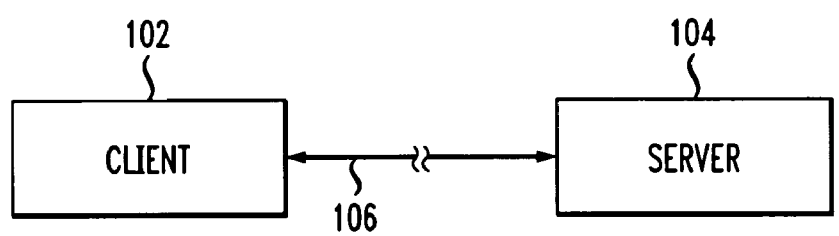
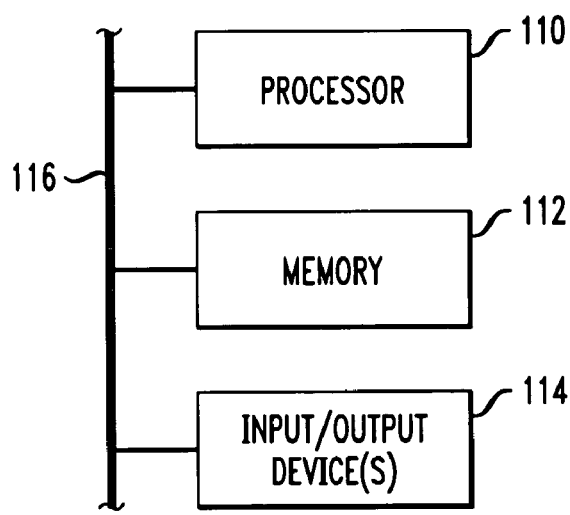
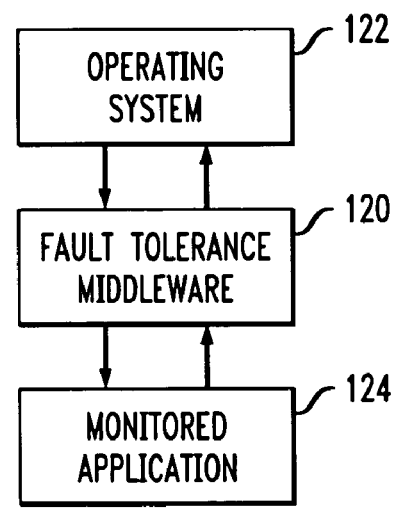

FAULT TOLERANCE SOFTWARE SYSTEM WITH PERIODIC EXTERNAL SELF-TEST FAILURE DETECTION

FIELD OF THE INVENTION

The present invention relates generally to fault tolerance software systems, and more particularly to failure detection techniques for use in such systems.

BACKGROUND OF THE INVENTION

A number of commercial software-based fault tolerance products are known in the art. These include Microsoft Cluster Server (MSCS), available from Microsoft Corporation of Redmond, Wash., USA, and Legato Automated Availability Manager, available from Legato Systems Inc., www.legato.com. Another known system is the Software-Implemented Fault Tolerance (SwiFT) system, available from Avaya Inc. of Basking Ridge, N.J., USA, and described in greater detail at http://www.research.avayalabs.com/project/swift. Such systems typically operate in a distributed computing environment that includes multiple computers or other computing machines. For example, a client-server environment is one type of distributed computing environment in which fault tolerance systems are utilized.

The above-noted conventional fault tolerance systems typically include a failure detection component and a failure recovery component. The failure detection component determines if a monitored application, process or other program has terminated, aborted or otherwise failed. For example, in the above-noted SwiFT system, a monitoring process referred to as watchd serves as the failure detection component. The recovery component initiates recovery actions in the event that a failure is detected by the failure detection component. A given recovery action may involve restarting the program on the same machine or another machine. As is well known, a program may be restarted from its initial starting point or via rollback to a designated checkpoint subsequent to its initial starting point.

One common technique for failure detection involves monitoring messages and other signals from the operating system of a given machine to determine if a program on that machine has failed. Another technique involves periodic polling of the program to determine if the program is still "alive." Other techniques focus on monitoring of the program environment or resource consumption. With techniques of this type, a failure may be indicated if a set of resources currently being consumed exceeds a threshold or if a set of available resources needed for proper operation of the program decreases below a threshold. Still other failure detection techniques involve modification of the program being monitored. An example of this type of technique is the insertion of a "heartbeating" mechanism in a program, with the mechanism being monitored by another program external to the monitored program.

There are a number of significant drawbacks associated with the conventional failure detection techniques identified above. For example, these techniques are unable to provide adequate detection of certain types of failures, such as program hangs and performance degradation. Although certain fault tolerance software systems, such as the MSCS system, support the creation of custom libraries to augment failure detection, the application program interfaces (APIs) and processes required to create these libraries can often be unduly complicated. Moreover, such custom libraries generally must be created uniquely for each specific application, process or other program that is to be monitored.

A need therefore exists for an improved fault tolerance software system that can detect a wider range of failures than conventional systems, while avoiding the complexities associated with creation of custom libraries.

SUMMARY OF THE INVENTION

The present invention provides an improved fault tolerance system which overcomes one or more of the above-noted drawbacks of the prior art. More particularly, the invention provides improved fault tolerance through use of control and test script programs that implement a failure detection technique referred to herein as periodic external self-test.

In accordance with one aspect of the invention, fault tolerance is improved in a computing system which includes one or more computing machines by (i) executing a control thread or other control program in conjunction with a fault tolerance software system running on at least one of the machines, and (ii) initiating via the control program a test script program which sends one or more requests to a monitored program. The test script program also processes corresponding responses to the one or more requests, and generates a return value utilizable by the control program to indicate a failure condition in the monitored program. The computing system may be configured in accordance with a client-server architecture, with the fault tolerance software system and the monitored program both running on a server of the system.

In accordance with another aspect of the invention, the control program is implemented as a control thread of a failure detection process associated with a failure detection component of the fault tolerance software system. The test script program may be implemented as a process separate from the failure detection process, as a thread of the same failure detection process, or in other suitable program code configurations. For example, the test script program may comprise an interpreted script, a native executable or byte code.

In accordance with yet another aspect of the invention, the test script program is preferably implemented in an object-oriented programming language such as Java, and is configured such that one or more components of the test script program form a base class from which one or more other components of the test script program are generatable for use with the monitored program.

In accordance with a further aspect of the invention, the control program may initiate a persistent program as a thread, a process or both. The persistent program periodically initiates the test script program, receives the return value from the test script program, and delivers the return value to the control program.

Advantageously, the present invention provides a fault tolerance software system that is able to detect a wider range of failures than systems utilizing the above-noted conventional failure detection techniques. For example, a fault tolerance software system in accordance with the invention can be configured to detect program hangs and performance degradation. Moreover, the invention provides this improved failure detection without the excessive complexity commonly associated with approaches such as the creation of custom libraries, and without requiring any modification of a monitored program. Test scripts can be written independently of fault tolerance middleware, thereby permitting simple and rapid development. The invention is particularly well suited for use in monitoring server processes in a client-server system, but can be used in other types and arrangements of computing systems.

BRIEF DESCRIPTION OF THE DRAWINGS

FIG. 1 is a block diagram illustrating an exemplary computing system in which the invention may be implemented.

FIG. 2 shows a more detailed view of an example client or server machine in the computing system of FIG. 1.

FIG. 3 illustrates the relationship of a fault tolerance software system in which the invention is implemented to a machine operating system and monitored application.

DETAILED DESCRIPTION OF THE INVENTION

Figure 4A:
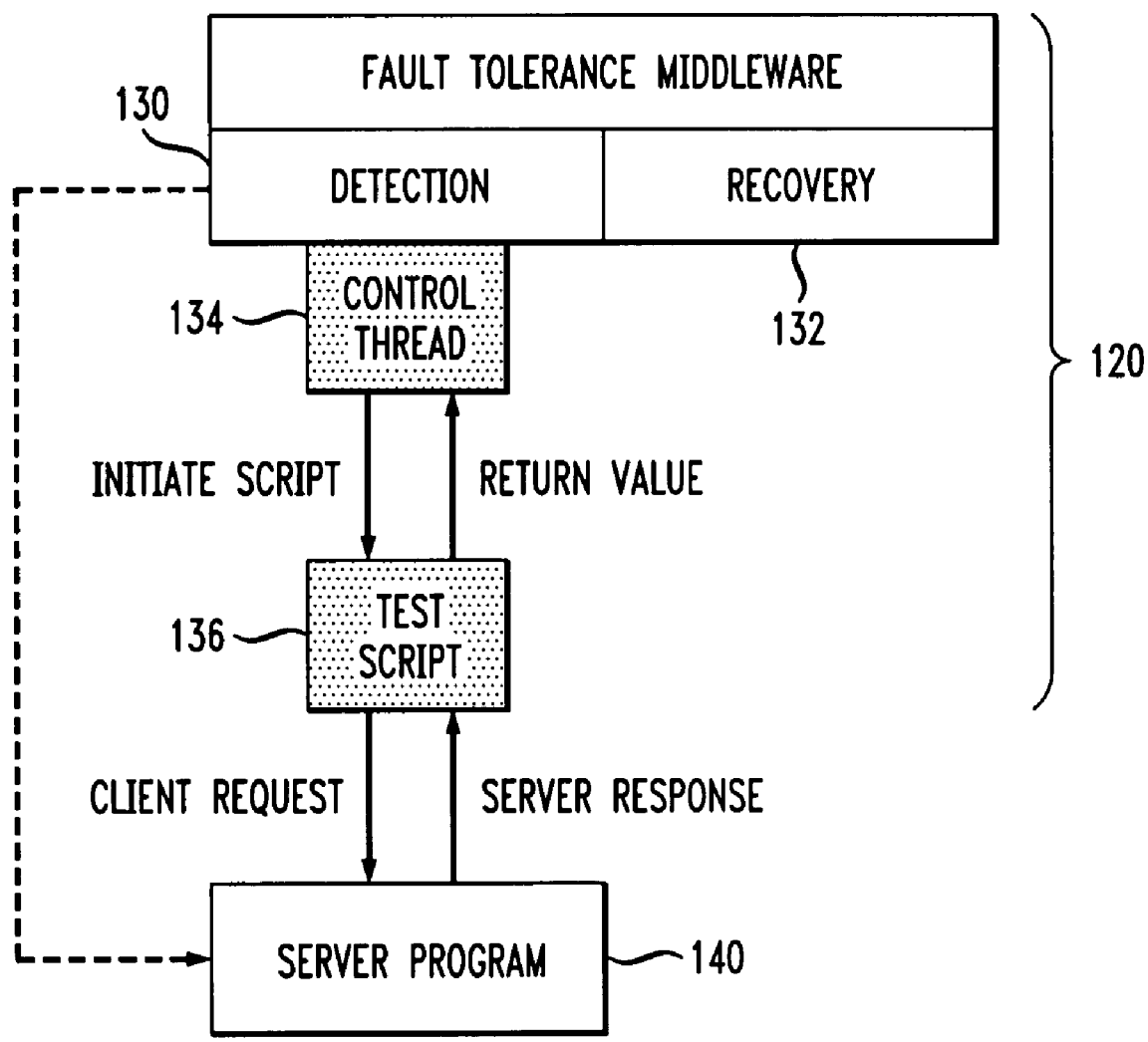
FIGS. 4A and 4B show illustrative embodiments of the invention as implemented to monitor a server program in the FIG. 1 system.

The present invention will be illustrated below in conjunction with an exemplary client-server computing system. It should be understood, however, that the invention is not limited to use with any particular type of computing system, but is instead more generally applicable to any computing environment in which it is desirable to provide improved fault tolerance. The disclosed techniques can be utilized with computers or other processors arranged in local area networks, wide area networks, metropolitan area networks, intranets, extranets and global networks such as the Internet. The term "program" as used herein is intended to include any type of process, thread, application, set of instructions or other type of code which runs on one or more computers or other types of processors in a computing system. The term "computing system" is intended to include any system which includes one or more computers, processors or other computing machines.

FIG. 1 shows an example computing system 100 in which the present invention is implemented. The system 100 includes a client machine 102 coupled to a server machine 104 via a connection 106. The connection 106 may represent a network connection established over a network in a conventional manner. It should be appreciated that the system 100 is simplified for purposes of illustration, and in practical application may include multiple client and/or server machines. The present invention in the illustrative embodiments to be described below is implemented as a fault tolerance software system that runs on the server 104 of system 100, although in other embodiments the inventive system may run on the client 102 or on both the client 102 and the server 104.

FIG. 2 shows a simplified diagram of a particular one of the client and server machines 102, 104 of FIG. 1. The machine in this example implementation includes a processor 110, a memory 112 and one or more input/output devices 114, all of which are configured to communicate over interconnections 116 that may represent, e.g., one or more system buses. The processor 110 may be implemented as a microprocessor, central processing unit (CPU), application-specific integrated circuit (ASIC) or other processing device, as well as portions or combinations of such devices. The memory 112 may be implemented as an electronic memory, and may also or alternatively comprise other types of devices, e.g., magnetic devices, optical devices, etc.

FIG. 3 illustrates the relationship between different software elements running on the server 104 in the illustrative embodiments. As noted above, the invention in these illustrative embodiments is implemented in a fault tolerance system running on server 104. This system is denoted in FIG. 3 as element 120, and is also referred to herein as fault tolerance "middleware" in that it may be viewed as residing between an operating system 122 and a monitored application 124 on the server 104 of system 100. The fault tolerance middleware 120 can be any software system that performs failure detection and recovery, as modified in accordance with the techniques of the invention. The application 124 is the application monitored by the fault tolerance middleware 120, and may be, e.g., a server program.

The present invention in the illustrative embodiments described herein provides improved fault tolerance through use of control and test script programs to implement a failure detection technique referred to as periodic external self-test. This failure detection technique will be described in conjunction with FIGS. 4 through 8.

Figure 4B:
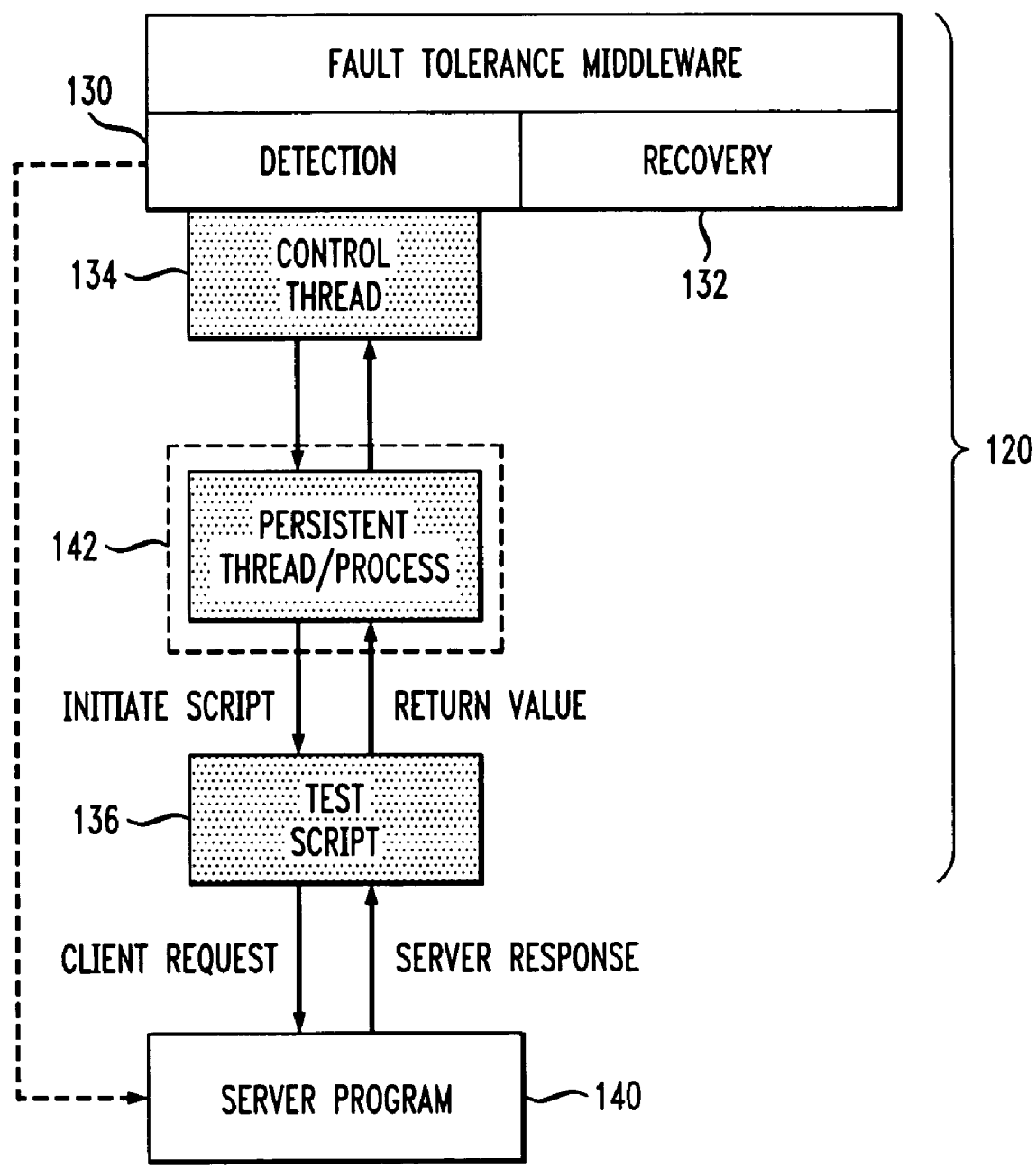

FIGS. 4A and 4B illustrate the operation of the fault tolerance middleware 120 as configured in accordance with the present invention. The fault tolerance middleware 120 in these figures comprises a failure detection component 130 and a recovery component 132. The present invention concerns primarily the operation of the detection component 130. The recovery component 132 may be implemented using conventional techniques well known to those skilled in the art, and its operation will therefore not be described in detail herein.

Referring to FIG. 4A, the failure detection component 130 in accordance with the invention has associated therewith a control thread 134 and a test script 136. The control thread 134 is generated by the failure detection component 130 and periodically invokes the test script 136. The test script sends one or more client requests to a server program 140 and then determines if the correct response or responses have been received from the server program. The test script then sends a return value to the control thread to indicate whether all responses were received correctly. If any response is not received correctly, then the control thread instructs the recovery component 132 to initiate appropriate recovery actions.

The term "return value" as used herein is intended to include a single value, a set of multiple values, or any other type of information that is utilizable to indicate a failure condition in a monitored program. In the illustrative embodiments, the return value is preferably a single value, e.g., either zero or non-zero, to indicate either a failure condition or a non-failure condition, respectively.

The term "failure condition" as used herein is intended to be construed broadly so as to include, without limitation, an actual failure of the monitored program or portion thereof, an abort condition, a termination of the program, a failure to meet specified performance or resource utilization goals, or any other condition that may require appropriate recovery action by a fault tolerance software system.

The period used for the above-noted periodic invocation of the test script 136 will typically be on the order of seconds or minutes, e.g., about 5 seconds to about 10 minutes. The actual period used in a given implementation of the invention may vary depending on a number of factors, such as the processing resources required on the corresponding computing machine. In general, it is desirable to make the period as short as possible without significantly impacting the performance of the monitored application.

The control thread 134 and test script 136 are shown as shaded in FIGS. 4A and 4B to indicate that these components may be added to or otherwise utilized in conjunction with otherwise conventional fault tolerance middleware.

By way of example, in a typical implementation of the embodiments of FIGS. 4A and 4B, the control thread 134 may be incorporated into an otherwise conventional commercially available fault tolerance middleware software package, and sold to users as part of that package. The users could then generate their own test scripts as required for particular monitored applications, in the manner described herein. In this typical implementation, the test script is viewed as "external" to the fault tolerance middleware. In other implementations, one or more of the test scripts may be incorporated into the fault tolerance middleware itself, but may still be viewed as "external" in that the one or more test scripts generally operate independently of the conventional failure detection provided by the middleware.

The illustration of control thread 134 and test script 136 as comprising part of middleware element 120 in FIGS. 4A and 4B should therefore be understood to be merely an example, and in no way limiting of the scope of the invention.

The dashed line shown between failure detection component 130 and the server program 140 in FIGS. 4A and 4B is intended to denote conventional monitoring that may be provided by failure detection component 130 apart from the inventive monitoring provided using control thread 134 and test script 136. This conventional failure detection may be utilized in conjunction with the inventive failure detection provided using control thread 134 and test script 136, or may alternatively be disabled, such that the system relies only on the inventive failure detection. In practice, it will often be desirable to utilize both conventional failure detection and the inventive failure detection.

The term "test script" as used herein should be understood to include, without limitation, an interpreted script, a native executable, an intermediate format such as byte code, or other suitable configuration. The test script can be written in any desired programming language, such as shell scripts (e.g., ksh, csh), interpreted languages (e.g., perl), natively compiled languages (e.g., C, C++), and byte code compiled languages (e.g., Java).

The test script 136 may be more tightly integrated with the control thread 134 by executing the test script as a thread in the same process as the control thread. However, such integration may require the development of a test script language. By executing the test script in a separate process, the test script can be written in any language, as previously noted.

The particular type of client requests sent by the test script 136 to the server program 140 upon initiation by the control thread 134 will depend upon the type of server program 140 to be monitored in a given embodiment of the invention. For example, if the server program 140 is a web server for responding to client requests received over the Internet, the client requests generated by the test script 136 may be otherwise conventional HyperText Transfer Protocol (HTTP) requests. The HTTP protocol is described in greater detail in "Hypertext Transfer Protocol—HTTP/1.0," Network Working Group, May 1996, <http://www.ics.uci.edu/pub/ietf/http>, which is incorporated by reference herein. Other types of requests that may be generated by test script 136 include, e.g., File Transfer Protocol (FTP) requests, secure HTTP (HTTPS) requests, "gopher" requests, or any other client requests that may be directed to the server program 140 to determine if the program is generating an appropriate response.

As will be described in greater detail below, the present invention can be implemented through modification of an otherwise conventional fault tolerance software system or middleware, such as the above-described MSCS or SwiFT systems. Specific implementations for use with the MSCS and SwiFT systems will be described in conjunction with FIGS. 6 through 8.

FIG. 4B shows another embodiment of the fault tolerance middleware 120 in accordance with the invention. This embodiment addresses an issue which can arise, e.g., when implementing the invention through modification of an otherwise conventional MSCS system or similarly-configured system. In the previously-described FIG. 4A embodiment, the control thread 134 initiates the test script 136. By way of contrast, in the FIG. 4B embodiment, the control thread 134 initiates a persistent thread and/or process 142. The thread/process 142 is "persistent" in that it is only started by the control thread 134 if not already present. If the thread/process 142 is already present, the control thread 134 does not start up another thread/process, but simply communicates with the persistent thread/process 142. The persistent thread/process 142 initiates the test script 136 periodically and determines the result of the test script by reading the return value from the test script. The periodicity of the communication between the control thread 134 and the persistent thread/process 142 is independent of that of the initiation of the test script 136 by the persistent thread/process 142.

The FIG. 4B embodiment is well suited for implementation in fault tolerance systems in which a failure detection control thread is required to have a time limitation for completing its determination of the health of the monitored server program. This is the case for the above-noted conventional MSCS system, which utilizes a LooksAlive( ) call that must return in less than 300 milliseconds, although the test script can often require several seconds to finish. Thus, the introduction of the persistent thread/process 142 allows the LooksAlive( ) call when implemented as control thread 134 to query the persistent thread/process within the required time limitation, while the more time-consuming work of running the test script is carried out by the persistent thread/process. Additional details regarding implementation of the invention in the MSCS system will be described below in conjunction with FIG. 7.

The persistent thread/process 142 in FIG. 4B may be implemented as, e.g., a separate thread within the fault tolerance middleware 120, as a process separate from the fault tolerance middleware 120, or using other suitable techniques known to those skilled in the art. The persistent thread/process 142 is thus shown within a dashed box in FIG. 4B, to indicate that it may but need not be implemented separate from the fault tolerance middleware 120.

Figure 5:
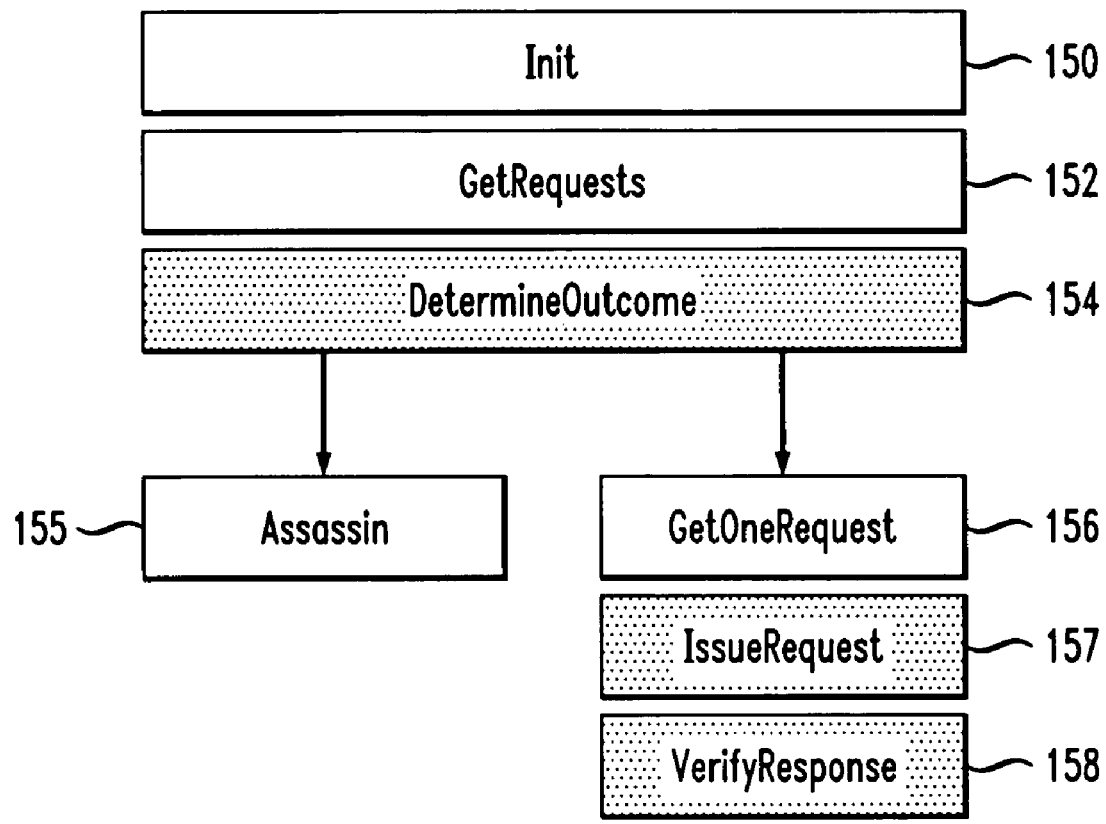
FIG. 5 is a block diagram of an example test script suitable for use in the embodiments of FIGS. 4A and 4B.

FIG. 5 illustrates one possible embodiment of the test script 136. The test script 136 in this embodiment includes a plurality of components, including an Init component 150, a GetRequests component 152, a DetermineOutcome component 154, an Assassin component 155, a GetOneRequest component 156, an IssueRequest component 157, and a VerifyResponse component 158. The Assassin component 155 and the GetOneRequest component 156 may be implemented as threads started by the GetRequests component 152.

The Init component 150, GetRequests component 152 and Assassin component 155 are examples of elements more generally referred to herein as an initialization component, an obtain requests component, and a request interruption component, respectively.

The IssueRequest component 157 and VerifyResponse component 158 are examples of elements more generally referred to herein as a request issuance component and a response verification component, respectively.

The Init component 150 parses command-line parameters and performs initialization tasks. The GetRequests component 152 performs the task of sending a set of sequential client requests to the server program 140. For each request, the GetRequests component creates an Assassin thread 155 and a GetOneRequest thread 156, via the DetermineOutcome component 154. The GetOneRequest thread 156 calls the IssueRequest component 157 to send a client request to the server program. When the server response is received, the VerifyResponse component 158 is called to determine if the received response is correct. If the server program has failed before it can return a response, the VerifyResponse component might never be called because it is still waiting for the server response. In that case, the Assassin thread 155 interrupts the GetOneRequest thread 156 as it waits for the server response. The Assassin thread waits for a specified timeout period before interrupting the GetOneRequest thread. In essence, this timeout period is the maximum time allowed for the server to return a response to the client.

The VerifyResponse component 158 may perform a checksum of all bytes in the response, with any non-deterministic parts of the response, such as timestamps, skipped in computing the checksum. In order to allow a single checksum to be used for verification, the server program 140 must be configured with the corresponding data. For example, a HyperText Mark-up Language (HTML) page may be placed in the directory tree of a web server, and the corresponding checksum of the HTML page may be used by the VerifyResponse component 158.

If the implementation language for the test script 136 is an object-oriented language, such as Java, then the non-shaded components in FIG. 5 can be abstracted into a base class. The base class can then be used to derive custom test scripts for different server programs. More particularly, the Init, Assassin, GetRequests and GetOneRequest components in FIG. 5 may be implemented in the base class, with a custom class containing the code for the DetermineOutcome, IssueRequest and VerifyResponse components. Advantageously, this object-oriented paradigm allows test scripts to be created without requiring the rewriting of the abstracted base class code.

It should be noted that the use of Java for the test script in the illustrative embodiments provides other advantages, including support for socket communication, Uniform Resource Locator (URL) requests, and checksum calculation, thereby facilitating issuance of client requests to a web server program.

Figure 6:
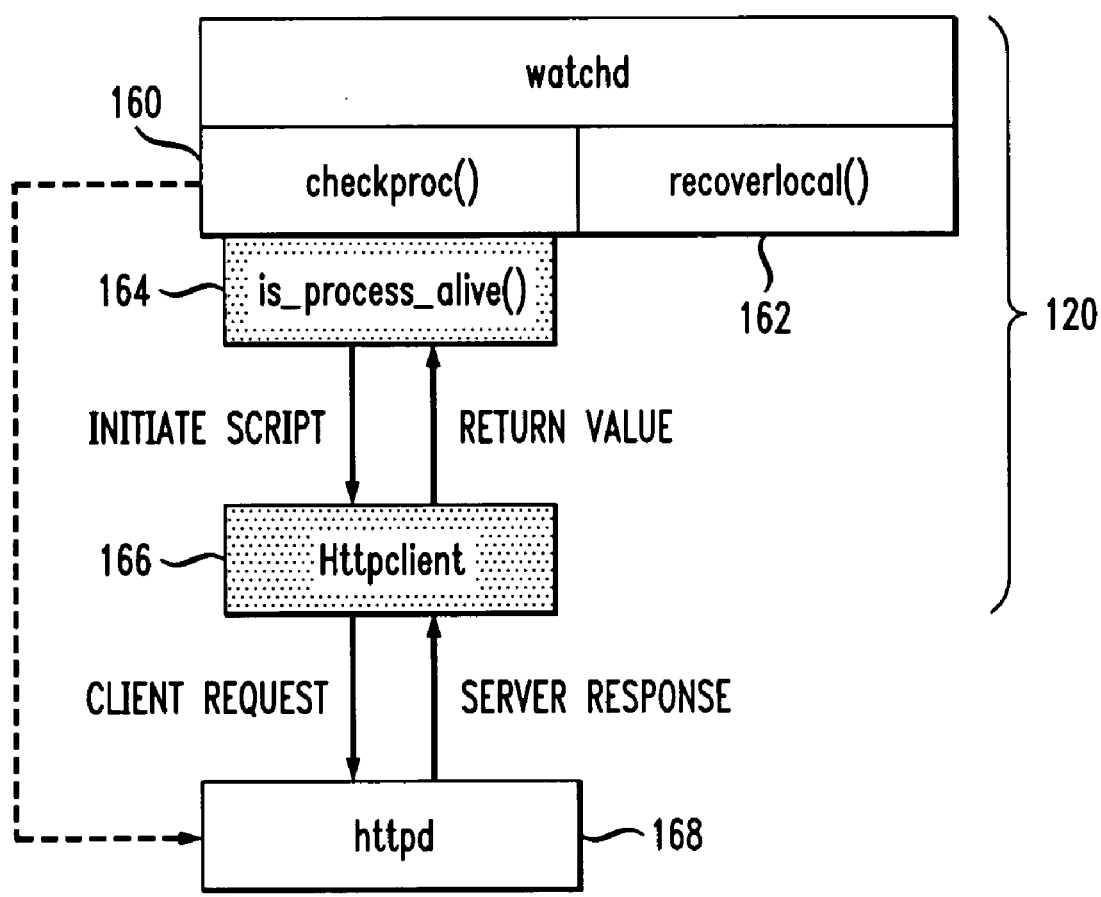
FIGS. 6 and 7 show alternative embodiments of the invention configured to operate with respective SwiFT and MSCS fault tolerance systems.

FIG. 6 shows an embodiment of the invention configured by modification of an otherwise conventional SwiFT fault tolerance software system. This embodiment operates in a manner similar to that previously described in conjunction with FIG. 4A. The fault tolerance middleware 120 in this embodiment is the above-noted watchd monitoring process of the SwiFT system, and includes a failure detection component 160 denoted as checkproc( ) and a failure recovery component 162 denoted as recoverlocal( ). In accordance with the invention, the failure detection component 160 is modified to generate a control thread 164 denoted as an is_process_alive( ) thread. This control thread initiates a test script 166 denoted as Httpclient. The Httpclient test script 166 generates client requests that are sent to the httpd server program 168, and monitors the responses, generating a return value that is sent to the control thread 164.

The control thread 164 in the FIG. 6 embodiment may be implemented using an existing checkprocalive( ) function that determines the health of a single process. Therefore, instead of creating a separate thread in the watchd process, the control thread 164 may be added at the end of the existing checkprocalive( ) function, to form the above-noted is_process_alive( ) thread. The above-described modification of the checkprocalive( ) function also simplifies the task of initiating recovery actions upon determination of a failure, since recovery may be initiated simply by returning from the modified checkprocalive( ) function with the proper return value.

Appendix 1 below shows an example set of code for the control thread 164 of the FIG. 6 embodiment.

Figure 7:
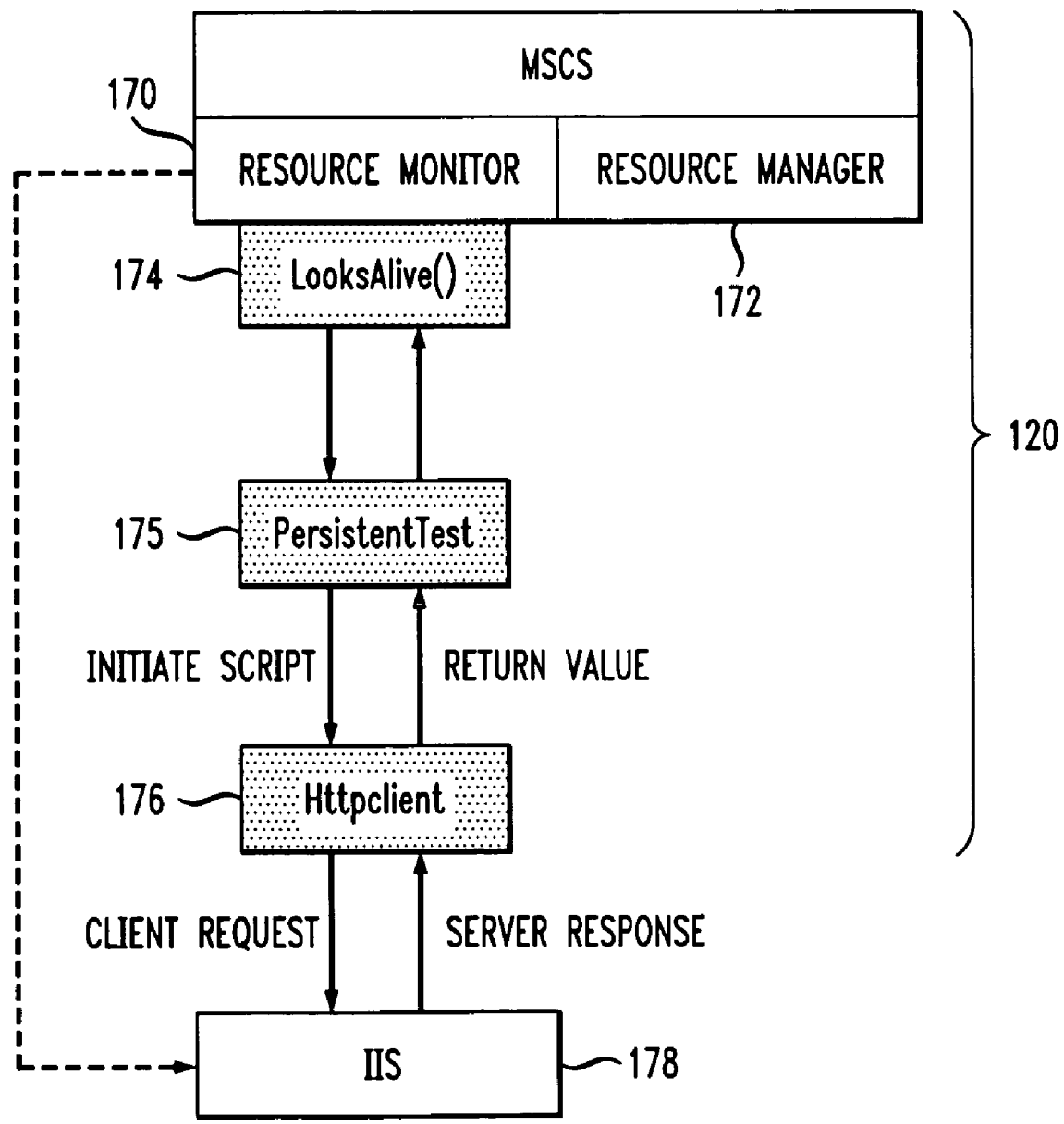

FIG. 7 shows another embodiment of the invention, configured through modification of an otherwise conventional MSCS fault tolerance system. This embodiment operates in a manner similar to that previously described in conjunction with FIG. 4B. The MSCS system includes resource monitor 170 and resource manager 172 that are in the form of dynamically loaded libraries (DLLs). A control thread 174 denoted as LooksAlive( ) interacts with a PersistentTest process 175. This process initiates an Httpclient test script 176 and receives a return value therefrom. The test script 176 sends client requests to a server program 178 denoted as a Microsoft Internet Information Server (IIS), receives corresponding responses from the server, and generates the return value for delivery to the PersistentTest process 175.

Figure 8:
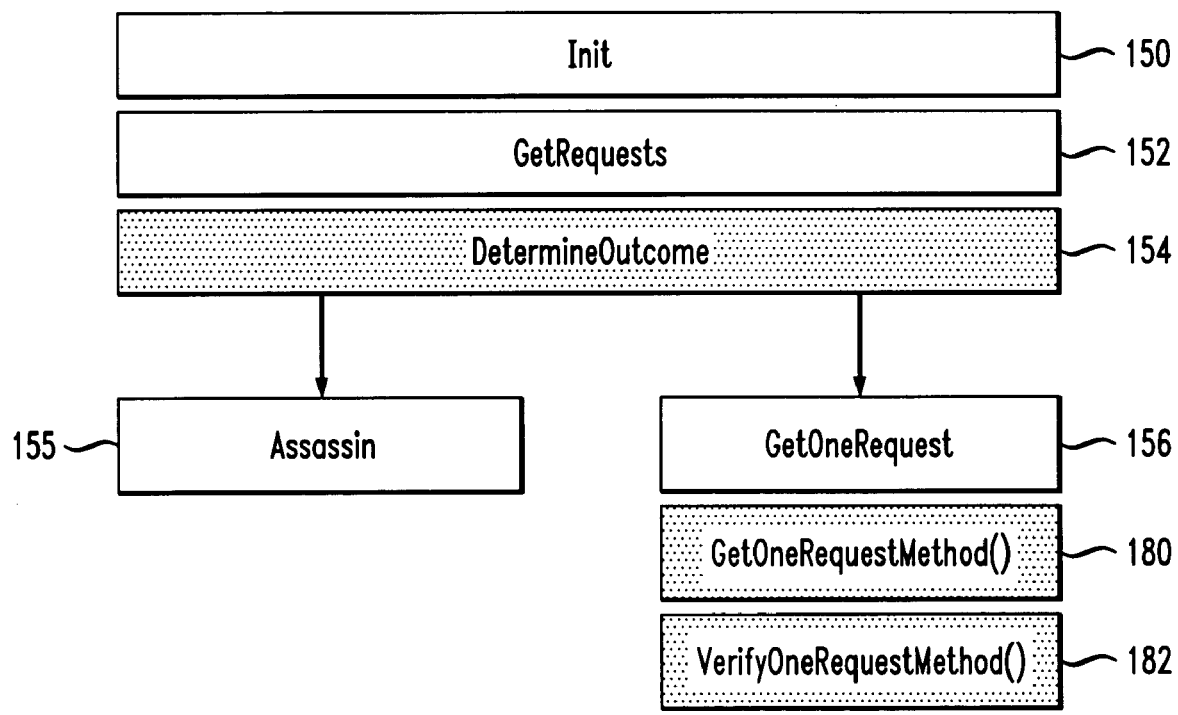
FIG. 8 is a block diagram of an example test script suitable for use in the embodiments of FIGS. 6 and 7.

FIG. 8 illustrates one possible embodiment of the Httpclient test script 166 or 176 that may be utilized in the arrangements of FIGS. 6 and 7, respectively. The Httptclient test script includes the components 150, 152, 154, 155 and 156 as previously described in conjunction with FIG. 5. The test script further includes a GetOneRequestMethod( ) component 180 and a VerifyOneRequestMethod( ) component 182, both associated with the GetOneRequest component 156 as shown.

Appendix 2 below shows an example Java base class code from which the Httpclient test script used in FIGS. 6 and 7 may be generated.

Appendix 3 below shows an example of Httpclient test script code generated from the Java base class of Appendix 2.

Table 1 below summarizes test results illustrating the fault tolerance advantages provided by the FIG. 6 embodiment of the invention as utilized to monitor an application comprising an Apache 1.3.6 web server implemented on a machine equipped with a Red Hat Linux Version 2.2.5-15 operating system. The table compares the failure performance of the application, given particular numbers of injected and activated faults, for implementations with no fault tolerance system, with the conventional watchd monitoring process, and with the modified watchd process as illustrated in FIG. 6. For these tests, the faults are injected using the Dependability Test Suite (DTS) fault injection tool, http://www.research.avayalabs.com/project/swift/detail/ntDTS. The DTS tool uses interception of library calls and corruption of parameters to inject faults into applications.

The Httpclient test script 166 was implemented in Java, in the manner shown in Appendices 2 and 3, and included the following two types of client requests: (1) an HTTP request for a 115 kB static HTML file, and (2) an HTTP request for a 1 kB static HTML file via the Common Gateway Interface (CGI). Verification of the server responses was based on checksum calculations of the HTML part of the server response. For each type of request, the Assassin component 155 of the test script waits 2 seconds before timing out the request. If the checksum verification for the response fails or the request is timed out, a second request is attempted after waiting another 2 seconds. If this second attempt also fails, the Httpclient test script returns with a non-zero return value.

The DTS tool injects faults into all functions in the standard libc.so.6 library of the watchd process. The library contains 1588 functions, of which 804 have parameters that can be corrupted. Of those 804 functions with parameters, 24 functions are called by the Apache web server for these tests.

One fault is injected for each execution of the server program, i.e., Apache is started, one fault is injected, the outcome is determined, and Apache is terminated. For each fault, one parameter of a particular function is corrupted. The corruption can be one of three types: (1) set all bits to 0x1, (2) clear all bits to 0x0, or (3) XOR all bits with 0x1. Each function parameter is injected with the three fault types. The results are summarized in Table 1.

TABLE 1

Performance Comparison for FIG. 6 Embodiment

|  | Faults Injected | Faults Activated | Failures | Restarts |
|---|---|---|---|---|
| No Fault Tolerance | 820 | 144 | 83 | 0 |
| Conventional watchd | 825 | 150 | 11 | 71 |
| Modified watchd | 825 | 150 | 0 | 83 |

Each row of the table shows the results for a particular fault tolerance configuration. The second column in the table shows the total number of injected faults. However, not all injected faults are called by the example Apache application being monitored. The number of called or activated faults is shown in the third column. The fourth column shows the number of faults that caused the Apache application to fail. The final column shows the number of faults that caused the Apache application to be restarted in such a manner that all client requests were eventually correctly handled.

It can be seen from Table 1 that the conventional watchd process dramatically decreases the number of failures from 83 to 11 relative to no fault tolerance system. However, for the watchd process modified in accordance with the techniques of the invention, the number of failures decreases to zero.

The setsockopt( ) function is one Apache function that the conventional watchd process was unable to handle. More specifically, faults injected into the setsockopt( ) function caused the Apache application to hang without terminating, and the conventional watchd process was unable to determine that the application was hung. The watchd process as modified in accordance with the invention was able to correctly diagnose all such hang scenarios as hangs, thus prompting a restart of the Apache application.

It should be noted that the particular test script used in the performance tests summarized in Table 1 is given by way of example only. In practice, it will often be desirable to incorporate a wider variety of different types of client requests into the test script. The actual failure coverage for a given application is dependent on the types of requests that are issued by the test script.

There is a certain amount of overhead associated with executing the test script. This overhead is determined by factors including: (1) the overhead for each request and verification, (2) the number of requests and retries, (3) the wait period between request retries, and (4) the period between invocations of the test script. If the test script is invoked every few seconds, the number of additional requests that are sent to a loaded server program is relatively small. If the test script issues ten different types of requests each time it is invoked, and the test script is invoked every five seconds, the extra overhead for the server program is 10 extra requests every five seconds. Since a loaded server program should be able to handle hundreds of requests per second, this extra overhead is small. In any case, the frequency of the test script invocation can be decreased to obtain an acceptable performance overhead.

As is apparent from the foregoing, the fault tolerance techniques in the illustrative embodiments of the invention provide a number of significant advantages over corresponding conventional techniques.

One such advantage is that a wider range of failures can be detected than in corresponding conventional implementations. For example, if a server program is hung in an infinite loop or blocked due to a very long wait for a resource, the test script will determine that the server is incapable of servicing requests. The control thread will then initiate recovery actions that restart the server program. The test script can also detect quality of service degradations or other performance degradations. For instance, if a memory leak is causing virtual memory to be swapped out to disk at a high rate, then the server performance can degrade. The test script can determine that the request response times from the server are unacceptably high. The control thread would then initiate actions to clear the memory leak by restarting the program or by rebooting the machine. The test script approach is able to detect both of these situations, program hangs and performance degradation, because the failure detection process closely fits the natural definition of program failure, i.e., a failure of a client-server system occurs when the server is not able to respond correctly to client requests.

Another advantage is that the inventive techniques do not require any modification of the monitored program, either in terms of recompilation or in terms of the addition of static or dynamic libraries. In addition, the only required Application Programming Interface (API) for implementing the techniques is the client-server protocol required to send client requests to the particular monitored program (e.g., HTTP for the web server example).

Yet another advantage is that test scripts can be written independently of the original fault tolerance middleware. This allows test scripts to be developed in a simple and rapid manner.

It should be noted that the above-described illustrative embodiments of the invention can be implemented in a variety of computing applications. The particular configurations of fault tolerance systems, control threads, test scripts and other elements shown in the illustrative embodiments are by way of example only, and numerous alternative embodiments within the scope of the following claims will be readily apparent to those skilled in the art.

APPENDIX 1

The following is an example set of code for the control thread 164 added to the watchd process in the illustrative embodiment of FIG. 6:

```c
#include <signal.h>
/*
 * If a PEST script hasn't returned in 30 seconds, assume that the script has
 * failed.
 */
#define MAX_PESTTEST_SECONDS    30
/*
 * MAX_PESTCMD_LEN is the maximum number of bytes allowed in a PEST command.
 */
#define MAX_PESTCMD_LEN         255
/*
 * Is the process with the specified PID still alive? If so, return 1; else
 * return 0.
 */
int is_process_alive(int pid) {
  char pestcmd[MAX_PESTCMD_LEN+1];
  int    childpid;
  /*
   * Perform the normal tests to see if the process is alive. This might
   * involve sending signals, receiving heartbeats, etc.
   */
  if(!normal_process_test_passes(pid)) {
    /*
     * Since we've already determined that the process has already failed,
     * we don't need to do the PEST test. So, just return with 0.
     */
    return 0;
  }
  /*
   * Get the name of the PEST command associated with this process.
   * get_pestcmd( ) will read the PEST configuration file to find this
   * information. If the file can't be read or the PEST command can't be
   * found, then get_pestcmd( ) should return 1; else it should return 0.
   */
  if (get_pestcmd(pid, pestcmd, sizeof(pestcmd))) {
    /*
     * If we can't find the PEST command for this process, we can't do the
     * PEST test, and so we have to assume that the process is still alive.
     */
    return 1;
  }
  /*
   * If the PEST command is specified as "ALWAYS_PASS", then return as though
   * the PEST script would have passed.
   */
  if(!strcmp(pestcmd, "ALWAYS_PASS"))
    return 1;
  /*
   * Now execute the PEST command for this process. Wait at most
   * MAX_PESTTEST_SECONDS for the PEST command to finish. If
   * MAX_PESTTEST_SECONDS passes without a response from the PEST command,
   * then assume that the process has failed.
   */
  if((childpid=fork( ))) {
    /*
     * Parent -- wait for the PEST command to return; the result of the
     *          command will be in the return value
     */
     int    status, i;
    /*
     * Check every second to see if the PEST command has finished. We have
     * to use a non-blocking waitpid because we have to be able to
     * determine after MAX_PESTTEST_SECONDS if the PEST command has hung.
     */
    for (i=0;i<MAX_PESTTEST_SECONDS;i++) {
      waitpid(childpid, &status, WNOHANG);
      if (WIFEXITED(status))
      break;
      sleep(1);
    }
    if(i >= MAX_PESTTEST_SECONDS) {
      /*
       * The PEST script never returned, so we need to kill it.
       */
      kill(childpid, SIGKILL);
    }
    else {
```

APPENDIX 1-continued

```
        if (WIFEXITED(status) && WEXITSTATUS(status)==0) {
          // The PEST script returned with 0, which means that the script
          // passed.
          return 1;
        }
      }
    }
  }
  else {
    /*
     * Child -- execute the PEST command
     */
    /*
     * We need to get the first white-space delimited string to pass to
     * execlp( ).
     */
    char filename[MAX_PESTCMD_LEN+1];
    char *end_of_filename = strchr(pestcmd, ' ');
    if(end_of_filename) {
       strncpy(filename, pestcmd, end_of_filename-pestcmd);
    }
    else {
       strncpy(filename, pestcmd, sizeof(filename));
    }
    if(execlp(filename, pestcmd, NULL)) {
       char buf[100];
       snprintf(buf sizeof(buf), "ERROR: watchd: can't exec(%s)",
          pestcmd);
       perror(buf);
       // If we can't execute the PEST script, assume that the
       // test script failed.
       exit (1);
    }
  }
  /*
   * If we couldn't get an affirmative pass from the PEST test, then assume
   * that the test failed.
   */
  return (0);
}
```

APPENDIX 2

The following is an example set of client base class code from which the Httpclient test scripts 166 and 176 of the respective FIG. 6 and FIG. 7 embodiments may be generated:

```
import java.net.*;
import java.io.*;
import java.util.zip.*;
import java.util.*;
import java.text.*;
abstract class ClientBase {
  String   clientName;
  String   DEFAULT_SERVER_NAME = "cougar";
  String   serverName = null;
  String   outputFilename = null;
  int      maxtries = 3;
  int      waitPeriod = 7;        // seconds to wait between tries
  boolean  returned = false;
  int      numSucceeded = 0;
  int      numRetries = 0;
  boolean  encounteredError = false;
  int      incorrect;
  int      noResult;
  long     totalResponseTime = 0;
  String   requestList[ ];
  long     expectedChecksumList[ ];
  public ClientBase(String clientName, String requestList[ ],
            long expectedChecksumList[ ])
  {
    this.clientName = clientName;
    this.requestList = requestList;
    this.expectedChecksumList = expectedChecksumList;
  }
  public class Assassin extends Thread {
    int         seconds;
    Thread      boss;
```

APPENDIX 2-continued

```
        getOneRequest   target;
        int             count = 0;
        boolean         didKill = false;
        public Assassin(int seconds, Thread boss, getOneRequest target)
        {
            this.seconds = seconds;
            this.boss = boss;
            this.target = target;
            start( );
        }
        public void run( ) {
            synchronized (this) {
                if(count < 1) {
                    try { this.wait(seconds * 1000); }
                        catch (InterruptedException e) {
                        return;
                    }
                    if (count >= 1) {
                        return;
                    }
                }
                else {
                    return;
                }
            }
            System.out.println(clientName + ": Timed out after" + seconds +
                    "seconds");
            didKill = true;
            boss.interrupt( );
            target.stop( );
        }
    }
    public class getOneRequest extends Thread {
        ClientBase  parent;
        String      request;
        long        startTime, endTime;
        long        expectedChecksum, actualChecksum;
        int         totalBytesRead = 0;
        final int   BUFSIZE = 4096 * 16;
        byte[ ]     firstBuf = new byte[BUFSIZE];
        public getOneRequest(ClientBase parent, String request,
                long expectedChecksum)
        {
            this.parent         =parent;
            this.request = request;
            this.expectedChecksum = expectedChecksum;
            parent.returned = false;
            parent.encounteredError = false;
            start( );
        }
        public void run( ) {
            System.out.println(clientName + ": requesting" + request);
            startTime = System.currentTimeMillis( );
            try{
                getOneRequestMethod(this);
                verifyOneRequestMethod(this);
            } catch (ConnectException e) {
                System.out.println(clientName + ":" + e);
                System.out.println(clientName + ": Connection Failure:" +
                    request);
                parent.encounteredError = true;
                parent.returned = false;
            } catch (IOException e) {
                System.out.println(clientName + ":" + e);
                System.out.println(clientName + ": Unknown Failure:" +
                    request);
                parent.encounteredError = true;
                parent.returned = false;
            }
            endTime = System.currentTimeMillis( );
            totalResponseTime += (endTime − startTime);
        }
    }
    abstract void getOneRequestMethod(getOneRequest g)
        throws ConnectException, IOException;
    void getRequest(String request, long expectedChecksum) {
        getOneRequest g;
        for (int t=1; t<=maxtries; t++) {
            g = new getOneRequest(this, request, expectedChecksum);
```

APPENDIX 2-continued

```
        Assassin assassin = new Assassin(waitPeriod,
                Thread.currentThread( ), g);
        try{
            g.join( );
        } catch (InterruptedException e) {
            System.out.println(clientName +
                ": interrupted while waiting for join( )");
        }
        synchronized (assassin) {
            assassin.count++;
            if(assassin.count >= 1)
                assassin.notify( );
        }
        if (assassin.didKill) {
            System.out.println(clientName + ": Timeout Failure:" +
                request);
            returned = false;
        }
        if (returned) {
            if (encounteredError) {
                System.out.println(clientName + ": Incorrect: " + request);
                incorrect++;
            }
            else {
                System.out.println(clientName + ": Success: " + request);
                numSucceeded++;
                break;
            }
        }
        else {
            noResult++;
        }
        if(t < maxtries) {
            System.out.println(clientName + ": waiting" + waitPeriod +
                    "seconds");
            try { Thread.sleep(waitPeriod*1000); }
            catch (InterruptedException e) { }
        }
        numRetries++;
    }
}
abstract void usage( );
abstract void parse_cmd_line(String args[ ]);
int realCode(String args[ ]) {
    System.out.println(clientName + ": starting");
    parse_cmd_line(args);
    System.out.println(clientName + ": serverName =" + serverName);
    for (int i=0; i<requestList.length; i++) {
        getRequest(requestString(i), expectedChecksumList[i]);
    }
    System.out.println(clientName + ": Num Requests (succeeded/total): " +
            numSucceeded + "/" + requestList.length);
    System.out.println(clientName + ": Num Retries: " + numRetries);
    System.out.println(clientName + ": Num Incorrect: " + incorrect);
    System.out.println(clientName + ": Num No response: " + noResult);
    NumberFormat nf = NumberFormat.getInstance( );
    nf.setMaximumFractionDigits(3);
    nf.setMinimumFractionDigits(3);
    try {
        System.out.println(clientName + ": Avg. time: " +
            nf.format(((double)totalResponseTime/requestList.length)
                /1000));
    } catch (IllegalArgumentException e) {
        System.out.println(clientName + ": Avg. time: " + e);
    }
    System.out.println(clientName + ": finishing");
    if(outputFilename !=null) {
        try {
            PrintWriter out = new PrintWriter(new BufferedWriter(new
                            OutputStream Writer(new
                            FileOutputStream(outputFilename))));
            out.println("Num Requests (succeeded/total): " + numSucceeded +
                "/" + requestList.length);
            out.println("Num Retries: " + numRetries);
            out.println("Num Incorrect: " + incorrect);
            out.println("Num No response: " + noResult);
            try {
                out.println("Avg. time: " +
                        nf.format(((double)totalResponseTime/
```

APPENDIX 2-continued

```
                    requestList.length)/1000));
        } catch (IllegalArgumentException e) {
            out.println("Avg. time: " + e);
        }
        out.close( );
      } catch (IOException e) { }
    }
    if (numSucceeded < requestList.length)
      return (1); // Failed
    else
      return (0); // Passed
  }
  abstract String requestString(int i);
}
```

APPENDIX 3

The following is an example set of Java code for the Httpclient test scripts 166 and 176 of the respective FIG. 6 and FIG. 7 embodiments:

```
import java.net.*;
import java.io.*;
import java.util.zip.*;
class Httpclient extends ClientBase {
  static String    clientName = "Httpclient";
  static int       portNum = 80;
  /*
   * These are the URLs that Httpclient will attempt to fetch. All URLs must
   * be accessible for Httpclient to determine that the web server is alive.
   */
  static String requestList[ ] = {
    "file115k.html",
    "cgi-bin/static.pl",
  };
  /*
   * The content retrieved for each of the URLs in requestList[ ] must match
   * the checksums in expectedChecksumList[ ].
   */
  static long expectedChecksumList[ ] = {
    102365706,
    713121451,
  };
  public Httpclient(String clientName, String requestList[ ],
        long expectedChecksumList[ ])
  {
    super(clientName, requestList, expectedChecksumList);
  }
  void getOneRequestMethod(getOneRequest g)
      throws ConnectException, IOException
  {
    byte[ ]   buf = new byte[g.BUFSIZE];
    int       bytesRead=0;
    try {
      URL url = new URL(g.request);
      CheckedInputStream in = new
          CheckedInputStream(url.openStream( ), new Adler32( ));
      while ((bytesRead=in.read(buf, 0, g.BUFSIZE)) != −1) {
        if (g.totalBytesRead == 0) {
          // Save the first part of the file, in case we want to know
          // what the response code and possible message is.
          g.firstBuf = buf;
        }
        g.totalBytesRead += bytesRead;
      }
      g.parent.returned = true;
      g.actualChecksum = in.getChecksum( ).getValue( );
      if (g.actualChecksum > 2147483647) g.actualChecksum −= 2147483647;
    } catch (MalformedURLException e) {
      System.out.println(clientName + ":" + e);
      System.exit(1);
    }
  }
  void verifyOneRequestMethod(getOneRequest g) {
    if (g.expectedChecksum!=−1 && g.actualChecksum!=g.expectedChecksum) {
      System.out.println(clientName + ": checksum = " +
          g.actualChecksum + "; should be " +
          g.expectedChecksum);
```

APPENDIX 3-continued

```
        System.out.println(clientName + ": read " + totalBytesRead +
            "bytes");
        System.out.println(clientName + ": Checksum Failure: " +
            request);
        g.parent.encounteredError = true;
        // If there is a checksum error, echo the first few lines
        // of the file to see what the error message is.
        System.out.println(clientName + ": File Contents: " + new
            String(firstBuf, 0, 200));
      }
   }
   String requestString(int i) {
      return ("http://" + serverName + ":" + portNum + "/" + requestList[i]);
   }
   void usage( ) {
      System.out.println("Usage: java" + clientName +
            " [-o outputFilename] [-p portNum] [-w waitPeriod]");
      System.out.println("                [-m maxtries] [serverName]");
   }
   void parse_cmd_line(String args[ ]) {
      for (int i=0; i<args.length; i++) {
         if (args[i].equals("-o")) {
            outputFilename = args[++i];
         }
         else if (args[i].equals("-p")) {
            portNum = Integer.parseInt(args[++i]);
         }
         else if (args[i].equals("-w")) {
            waitPeriod = Integer.parseInt(args[++i]);
         }
         else if (args[i].equals("-m")) {
            maxtries = Integer.parseInt(args[++i]);
         }
         else if (args[i].equals("-h")) {
            usage( );
            System.exit(0);
         }
         else if (serverName == null) {
            serverName = args[i];
         }
         else {
            usage( );
            System.exit(2);
         }
      }
      if (serverName == null) {
         serverName = DEFAULT_SERVER_NAME;
      }
   }
   public static void main(String args[ ]) {
      int    status = 0;
      Httpclient client =
            new Httpclient(clientName, requestList, expectedChecksumList);
      status = client.realCode(args);
      // Do this just in case there are any threads lingering around that we
      // forgot about.
      System.exit(status);
   }
}
```

What is claimed is:

1. A method for use in providing improved fault tolerance in a computing system comprising at least one computing machine, the method comprising the steps of:

executing a control program in conjunction with a fault tolerance software system running on the at least one computing machine; and initiating via the control program a test script program which sends one or more requests to a monitored program, wherein the test script program processes corresponding responses to the one or more requests, and generates at least one return value utilizable by the control program to indicate a failure condition in the monitored program.

2. The method of claim 1 wherein the computing system is configured in accordance with a client-server architecture and the at least one computing machine comprises a server of the computing system.

3. The method of claim 1 wherein the control program comprises a control thread of a failure detection process associated with a failure detection component of the fault tolerance software system.

4. The method of claim 1 wherein the control program comprises a thread of a failure detection process and the test script program comprises a process separate from the failure detection process.

5. The method of claim 1 wherein the control program comprises a thread of a failure detection process and the test script program comprises a thread of the same failure detection process.

6. The method of claim 1 wherein the test script program is implemented in an object-oriented programming language such that one or more components of the test script program comprise a base class from which one or more other components of the test script program are generatable for use with the monitored program.

7. The method of claim 6 wherein the object-oriented programming language comprises the Java programming language.

8. The method of claim 6 wherein the one or more components comprising the base class comprise one or more of an initialization component, an obtain requests component, and a request interruption component.

9. The method of claim 8 wherein the one or more other components generatable from the base class comprise a request issuance component and a response verification component, both particular to the monitored program.

10. The method of claim 9 wherein for each of the requests specified in the obtain requests component, that component creates corresponding ones of the request issuance component and the request interruption component, and wherein the request interruption component terminates the corresponding request if a response from the monitored program is not received within a designated period of time.

11. The method of claim 1 wherein the control program initiates a persistent program, and the persistent program periodically initiates the test script program.

12. The method of claim 11 wherein the persistent program comprises at least one of a thread and a process.

13. The method of claim 11 wherein the persistent program receives the return value from the test script program and delivers it to the control program.

14. The method of claim 1 wherein the test script program comprises an interpreted script.

15. The method of claim 1 wherein the test script program comprises a native executable.

16. The method of claim 1 wherein the test script program comprises byte code.

17. An apparatus for use in providing improved fault tolerance in a computing system, the apparatus comprising:

at least one computing machine having a processor and a memory, the processor being operatively coupled to the memory, wherein the processor is operative: (i) to execute a control program in conjunction with a fault tolerance software system running on the at least one computing machine, and (ii) to initiate via the control program a test script program which sends one or more requests to a monitored program, wherein the test script program processes corresponding responses to the one or more requests, and generates at least one return value utilizable by the control program to indicate a failure condition in the monitored program.

18. A storage medium for storing program code for use in providing improved fault tolerance in a computing system comprising at least one computing machine, wherein the program code when executed on the at least one computing machine performs the steps of:

executing a control program in conjunction with a fault tolerance software system running on the at least one computing machine; and initiating via the control program a test script program which sends one or more requests to a monitored program, wherein the test script program processes corresponding responses to the one or more requests, and generates at least one return value utilizable by the control program to indicate a failure condition in the monitored program.

* * * * *